US011299284B2

(12) United States Patent
Wang

(10) Patent No.: US 11,299,284 B2
(45) Date of Patent: Apr. 12, 2022

(54) AIRPLANE PROVIDING ENHANCED AVIATION AND A METHOD TO ENHANCE AVIATION THEREOF

(71) Applicant: Zhenkun Wang, Ashburn, VA (US)

(72) Inventor: Zhenkun Wang, Ashburn, VA (US)

( * ) Notice: Subject to any disclaimer, the term of this patent is extended or adjusted under 35 U.S.C. 154(b) by 75 days.

(21) Appl. No.: 16/893,894

(22) Filed: Jun. 5, 2020

(65) Prior Publication Data

US 2021/0179284 A1 Jun. 17, 2021

(30) Foreign Application Priority Data

Dec. 11, 2019 (CN) .......................... 201922216662.3

(51) Int. Cl.
*B64D 29/04* (2006.01)
*B64D 27/20* (2006.01)
*B64D 33/02* (2006.01)
*B64C 21/04* (2006.01)

(52) U.S. Cl.
CPC ............ *B64D 29/04* (2013.01); *B64D 27/20* (2013.01); *B64D 33/02* (2013.01); *B64C 21/04* (2013.01); *B64D 2033/022* (2013.01); *B64D 2033/0273* (2013.01)

(58) Field of Classification Search
CPC .. B64D 27/20; B64D 33/02; B64D 2033/022; B64D 2033/0273; B64C 21/04
See application file for complete search history.

(56) References Cited

U.S. PATENT DOCUMENTS

| | | | | | |
|---|---|---|---|---|---|
| 3,051,413 | A | * | 8/1962 | Pouit ..................... | B64C 23/005 |
| | | | | | 244/12.5 |
| 3,055,614 | A | * | 9/1962 | Thompson ............ | B64C 23/005 |
| | | | | | 244/15 |
| 3,161,377 | A | * | 12/1964 | Balluff ..................... | B64C 9/38 |
| | | | | | 244/12.5 |
| 4,482,108 | A | * | 11/1984 | Sutton ................. | B64C 29/0083 |
| | | | | | 244/23 B |
| 5,385,612 | A | * | 1/1995 | Li ............................ | B60S 1/54 |
| | | | | | 15/250.003 |
| 5,992,792 | A | * | 11/1999 | Arnason ................. | B64C 39/12 |
| | | | | | 244/215 |
| 10,207,812 | B2 | * | 2/2019 | Evulet .................... | B64D 27/10 |
| 2021/0231053 | A1 | * | 7/2021 | Mohr ...................... | B03C 3/025 |

* cited by examiner

*Primary Examiner* — Tye William Abell
(74) *Attorney, Agent, or Firm* — WPAT, PC

(57) ABSTRACT

This instant invention provides an airplane design mainly to eject rearward the high-speed exhaust gas from the engine of the airplane to flow through the upper surface of the wing, such that the forward propulsion forcing can be obtained via rearward ejecting the high-speed exhaust gas to push the air rearward, and also larger uplift forcing induced by a larger velocity difference vertically across the wing can be obtained to ascend the airplane at the same time. This velocity difference is generated because the air over the wing is accelerated by the ejected high-speed exhaust gas, but the air below the wing stays the same velocity, such that a bigger velocity difference is directly produced vertically across the wing, and thus more uplift forcing can be provided to ascend the airplane.

19 Claims, 8 Drawing Sheets

Perspective view of engines

Before improvement

Plane 1:

After improvement

Engine positions

Perspective view of engines

Foreign-object wiper

Enlarged view of foreign-object wiper

Plan 2:

Airplane equipped with two rear-nozzle engines and modified by adding a pair of transverse wings and a pair of longitudinal wings Plan 3:

Airplane equipped with two front-nozzle engines and modified by adding a pair of transverse wings and a pair of longitudinal wings

AIRPLANE PROVIDING ENHANCED AVIATION AND A METHOD TO ENHANCE AVIATION THEREOF

CROSS REFERENCE TO RELATED APPLICATION

This application claims the benefits of China application Serial No. 201922216662.3, filed Dec. 11, 2019, the disclosures of which are incorporated by references herein in its entirety.

TECHNICAL FIELD

The present disclosure relates in general to an airplane providing enhanced aviation and a method to enhance aviation of the airplane.

BACKGROUND

Over the past 100 years, the airplane, one of great historical inventions, has significantly improved human life without doubt. However, some related problems have been bothering people for a long time; such as a lengthy runway for taking off and landing, an inevitable expense in energy, and sucking of birds and foreign objects into the jet engine. This design is the improvement proposed for the above three problems.

SUMMARY

In this disclosure, improvements are carried out in three ways.

1. Changing mounting of the engine from a plug-in type into a built-in type. The plug-in jet engine of airplane is moved into the airplane as a built-in jet engine. By taking an airplane having two engines as an example, the two engines would be moved from places under corresponding wings into a lower front belly portion ahead of the wings. Reasons for this change include: (a) to reduce entire front area of the airplane so as to reduce wind resistance and thus to lower energy consumption; (b) to provide more options for arranging positions and styles of jet nozzles, which would be elucidated in a later section; and (c) to provide more selections for arranging engine intakes, which would be further explained in another section.

2. Modifying the shape of engine nozzle from a circle type into a pipe-type nozzle. When the engine is moved into the front belly portion of the airplane, a long exhaust pipe would be applied to guide the high-speed exhausted gas from the engine to an upper portion of the wing. An end portion of the exhaust pipe would be furnished with new-type nozzles.

The exhaust pipe extends along a front edge of the wing and provides therealong a plurality of the new-type nozzles. A size of the individual new-type nozzle is determined according to its distance to the engine. The farther the new-type nozzle to the engine is, the smaller its size would be. Under such an arrangement, the high-speed exhaust gas from the engine can be more evenly distributed to the top portion of the wing. Since the new-type nozzle closer to the engine would meet the exhaust gas with a higher pressure, thus a larger size of the new-type nozzle can adjust more evenly the pressure of the exhaust gas discharged from this instant new-type nozzle.

What is the reason that such a jet propulsion can shorten the distance for the airplane to take off? According to the aerodynamic theory, airplane lift is generated by the vertical difference in air velocity across the wing. Such a velocity difference vertically across the wing is fulfilled by a cross-sectional shape of the wing and the forward velocity of the airplane. Hence, only when the airplane accelerates to reach a preset forward velocity for taking off (200-300 km/hr generally, about 270 km/hr for Boeing 747, and about 320 km/hr for the Concorde), the velocity difference vertically across the wing can be sufficient for generating enough pressure difference to lift the airplane off the runaway. On the other hand, the velocity of the airplane is mainly contributed by the high-speed exhaust gas ejected rearward from the engine (such that sufficient air propulsion can be obtained).

This design is to eject the high-speed exhaust gas of the engine rearward from upper portions of the wing. Beside forward propulsion forcing can be obtained, such an ejection manner can directly accelerate the air over the wing so as to enlarge the velocity difference vertically across the wing. Namely, only with the air above the wing to be accelerate, not the air below the wing, more upward lift upon the wing can be obtained. Thereupon, by having the forward propulsion forcing and the increased upward lift, the required take-off distance for the airplane can be reduced. It is noticed that, upon such a modification in arranging the exhaust pipe with new-type rearward nozzles along and above the front edge of the wing, the forward propulsion forcing can be still maintained.

Regarding the runaway distance for landing the airplane, appropriate adjustment upon the engine ejection can be applied to modulate the landing lift and the forward propulsion forcing so as to shorten the distance for landing the airplane.

In this design, modification in changing the jet output is mainly to obtain a more direct lifting forcing for rapidly uplifting the airplane. In this invention, the high-speed exhaust gas ejected by the engine is directly led to the top portion of the wing. Thereby, the air flow above the wing can be directly accelerated, while the air flow below the wing won't be affected. Thus, the velocity or pressure difference vertically across the wing would generate a larger uplift to the wing, so that the airplane can ascend rapidly. Since the nozzles for ejecting the high-speed exhaust gas of the engine are located at the upper portion of the wing and keep the same rearward ejection direction, thus the forward propulsion forcing contributed by the engine would be still there for promoting ascending of the airplane. To integrate the forward propulsion forcing of the engine and the uplift forcing at the wings for ascending the airplane, three embodiments are introduced as follows in this disclosure.

Plan 1: By keeping the same configuration of the wing, apply a guide pipe to lead the fast-speed exhaust of the engine directly from the engine to the upper portion of the wing.

Plan 2: Symmetry to the airplane body, add another pair of transverse wings parallel and rear to the original wings of the airplane and a further pair of longitudinal wings parallel to the airplane body. In this embodiment, the engine includes a rear nozzle, and the guide pipe and the new-type nozzles are disposed at the rear portion of the original wing. The high-speed exhaust gas of the engine is led to eject and go through the upper surface of the corresponding longitudinal wing via the guide pipe. In this embodiment, these four transverse wings, including the original wings, are there to provide respective forward propulsion forcing for ascending the airplane. It shall be pointed out that the additional rear transverse wing, other than the original wing, is also designed to support the corresponding longitudinal wing.

Plan 3: Similar to foregoing Plan 2, Plan 3 has another pair of transverse wings parallel and rear to the original wings of the airplane and a further pair of longitudinal wings parallel to the airplane body. However, the engine of this plan includes a front nozzle, and the guide pipe and the new-type nozzles are disposed at the front portion of the original wing. The high-speed exhaust gas of the engine is led to eject and go through the upper surfaces of the corresponding original wing and the respective longitudinal surface via the guide pipe.

3. Location and shape of the air intake of the engine are changed, and an intake grille for filtering and removing foreign objects is furnished to the air intake. After building in the engine, the air intake of the engine is moved laterally to the front end of the airplane. Such an arrangement is to prevent foreign objects such as birds, from being sucking into the engine. As shown in FIG. 5 and FIG. 6, when the airplane hits a foreign object, according to Newtonian mechanics, the foreign object would take a reaction force that may put the foreign object at a situation to be blown way. However, if the foreign object is sticked to the grille, then a foreign-object wiper would be automatically activated to move along upper and lower tracks all the way over the grille, so that the foreign object can be wiped off. Since the outer frame of the grille is not an equilateral rectangle, but an oval, thus the upper and lower tracks are not parallel to each other. Therefore, a clear rod of the foreign-object wiper shall have a variable length to slide along the two tracks. In one exemplary example, the clear rod is consisted of two rods telescoped together and connected by a spring. While the distance between the two tracks becomes wider, the spring would be elongated so as to make longer the clear rod. On the other hand, while the distance between the two tracks becomes narrower, the spring would be depressed by the two rods so as to make shorter the clear rod. Upon such an arrangement, the stretchable clear rod can move smoothly over the outer oval frame.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
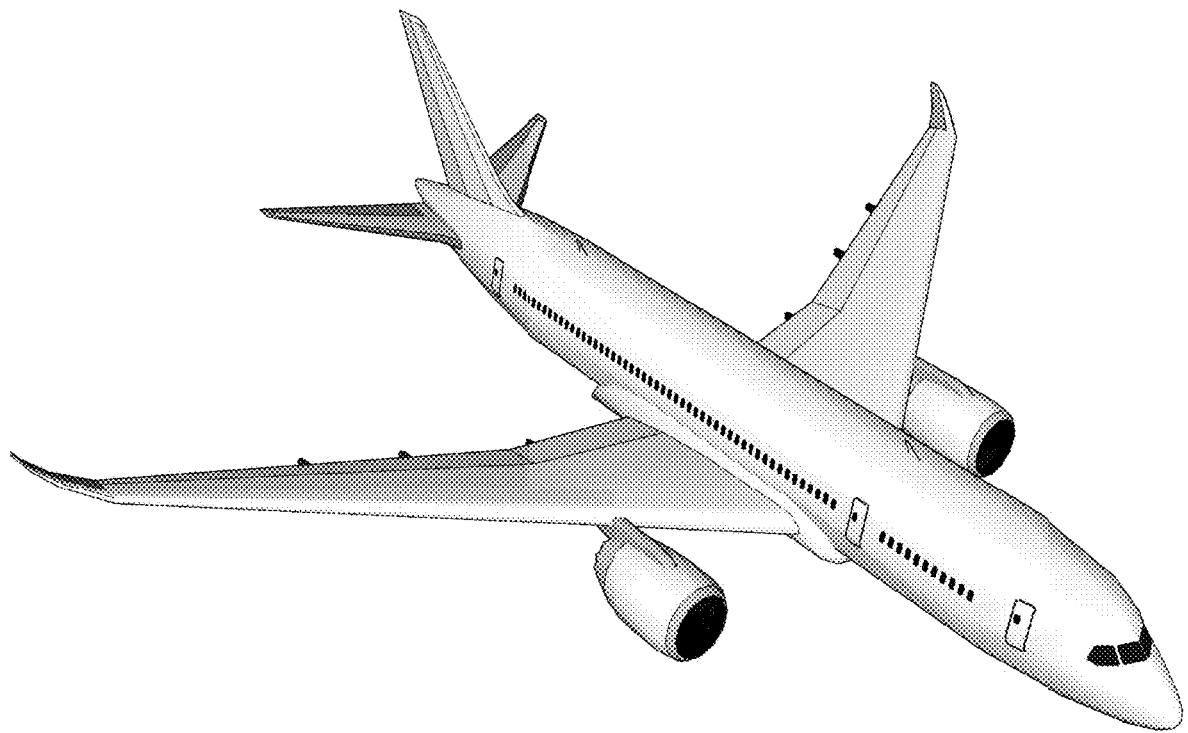
FIG. 1 is a schematic perspective view of an airplane prior to modification.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
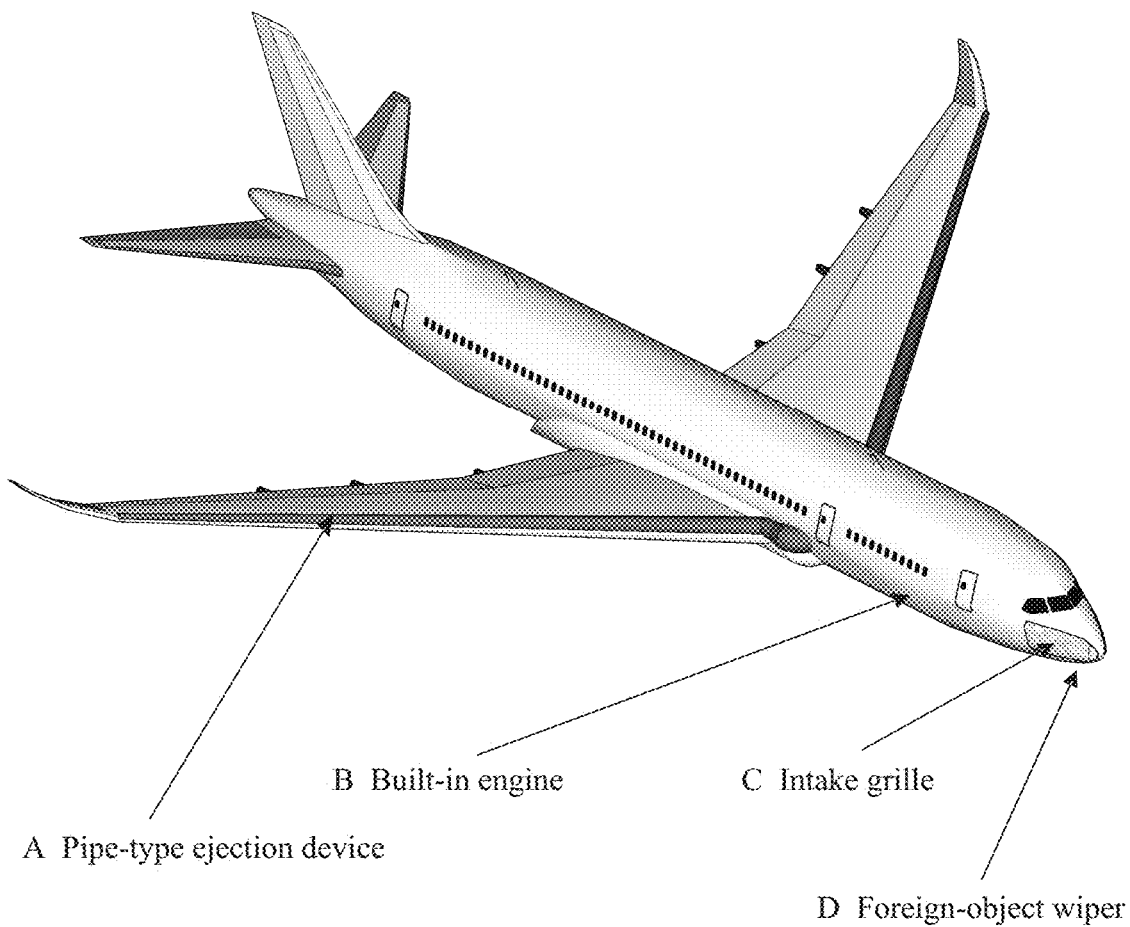
FIG. 2 is a schematic perspective view of the airplane of FIG. 1 after the modification in accordance with this disclosure.

1. FIG. 1 is a schematic perspective view of an airplane prior to modification, and FIG. 2 is a schematic perspective view of the airplane of FIG. 1 after Plan-1 modification in accordance with this disclosure. In these two figures, A stands for the pipe-type ejection device, B stands for the position of built-in engine, C stands for the position for installing the air intake and the intake grille, and D stands for the foreign-object wiper for the intake grille.

Figure 3:
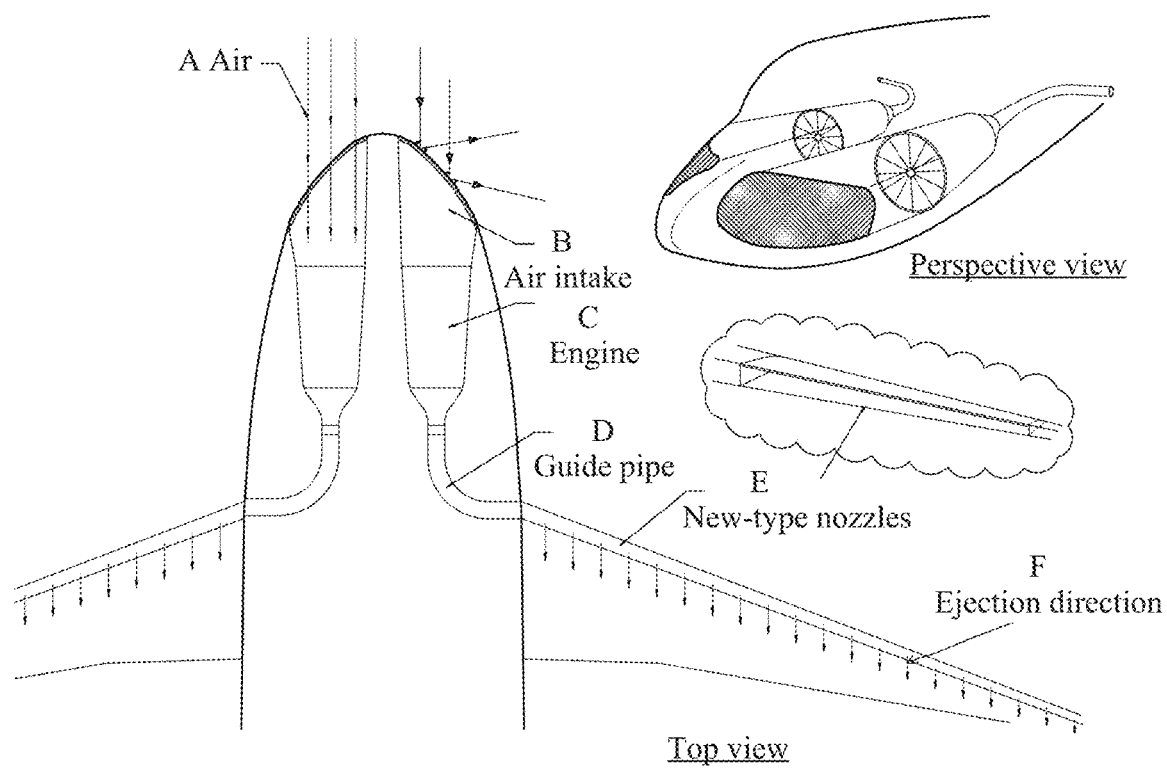
FIG. 3 is a schematic top view showing two engines inside the airplane in accordance with this disclosure.

2. FIG. 3 is a schematic top view showing two engines inside the airplane in accordance with this disclosure; in which A stands for the air intake, B stands for the engine air intake, C stands for the engine, D stands for the guide pipe, E stands for the portion of the guide pipe furnished with new-type nozzles, and F stands for the direction of the ejected exhaust gas. In the new-type nozzles, the farther the new-type nozzle to the engine is, the smaller its size would be.

Figure 4:
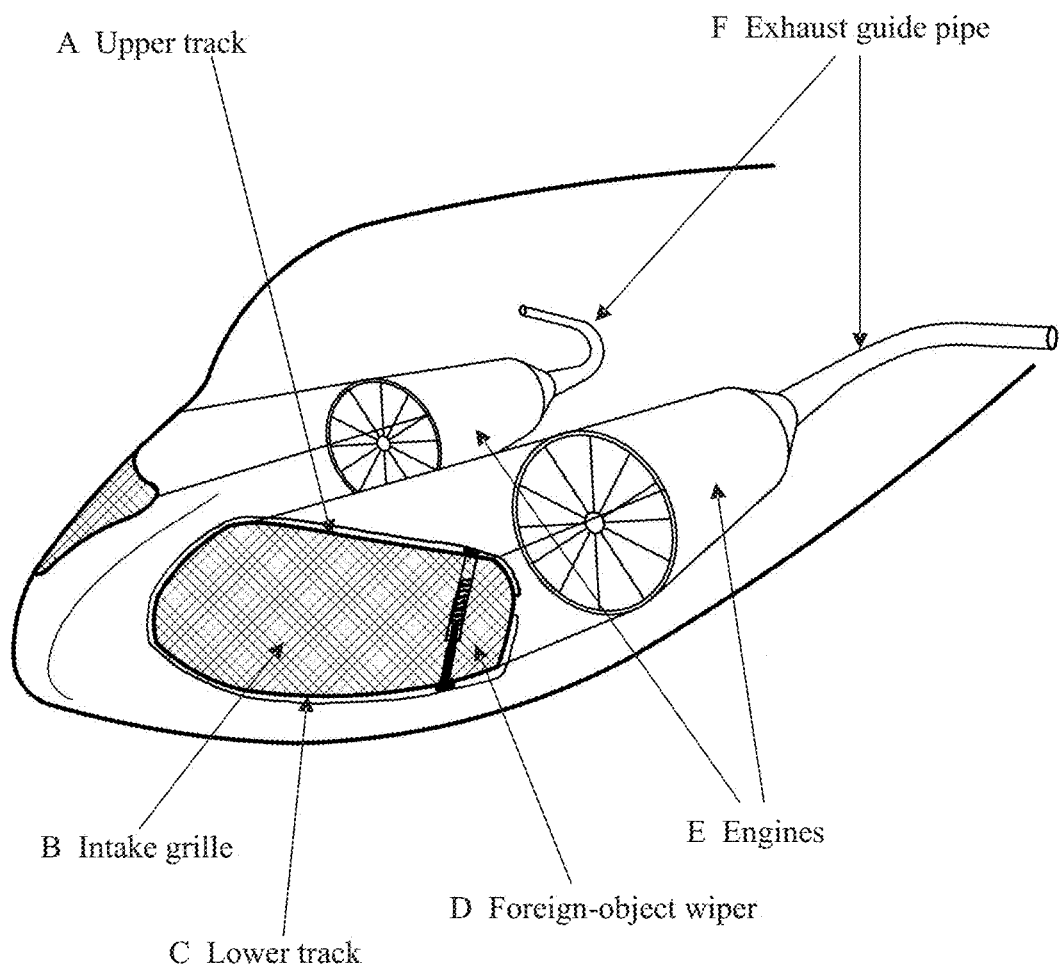
FIG. 4 is a schematic perspective view of FIG. 3.

3. FIG. 4 is a schematic perspective view of FIG. 3; in which the engines have been moved from places under the wings to new places inside the lower belly of the airplane. The new places for mounting the engines shall be in front of the wings. In this figure, A stands for the upper track for the foreign-object wiper, B stands for the intake grille, C stands for the lower track for the foreign-object wiper, D stands for the clear rod, E stands for the engines, and F stands for the guide pipes.

Figure 5:
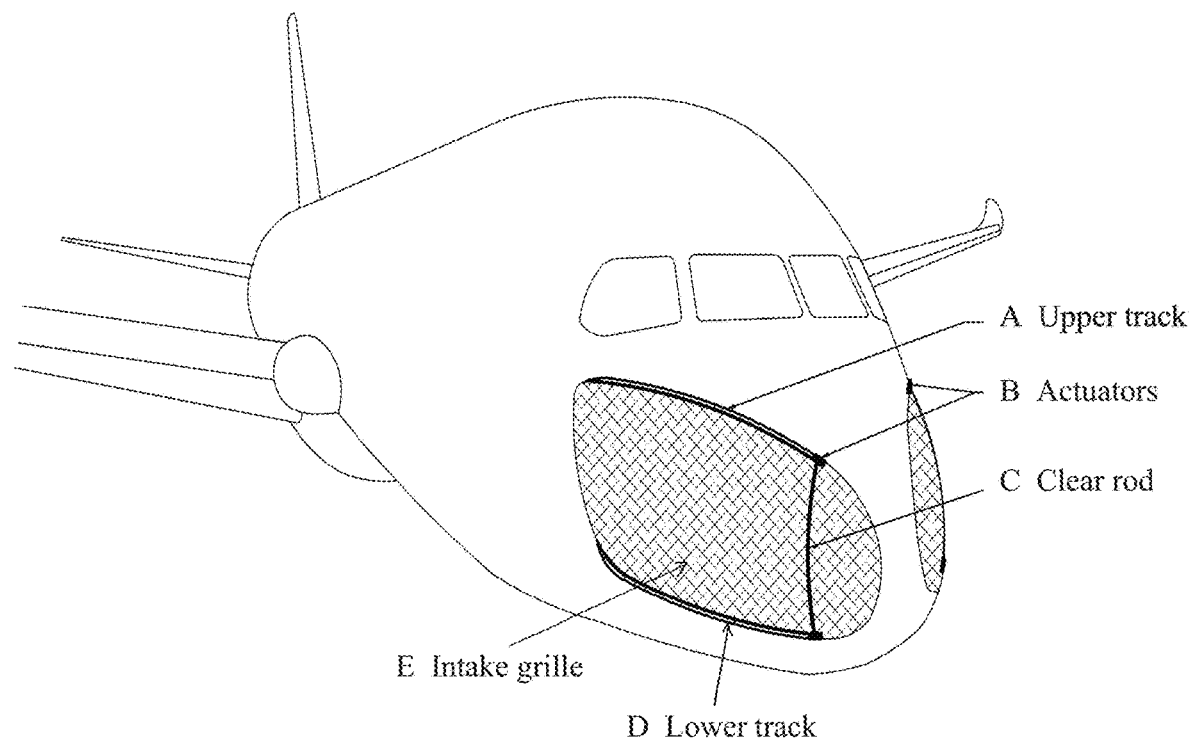
FIG. 5 is a schematic view of the foreign-object wiper of the airplane in accordance with this disclosure.

4. FIG. 5 is a schematic view of the foreign-object wiper of the airplane in accordance with this disclosure; in which A stands for the upper track for the foreign-object wiper, B stands for the actuators to drive the clear rods of the corresponding foreign-object wipers to slide outward along the tracks for clearing the foreign objects sticked on the intake grilles, C stands for the clear rod of the foreign-object wiper, D stands for the lower track for the foreign-object wiper, and E stands for the intake grille. Regarding the shape of the air intake, it can be a trumpet shape having a wider outer opening. Since the intake grille is furnished to the air intake, and the air intake is disposed laterally to the front end of the airplane, thus the trumpet-shape air intake can compensate the air intake amount of the engine.

Figure 6:
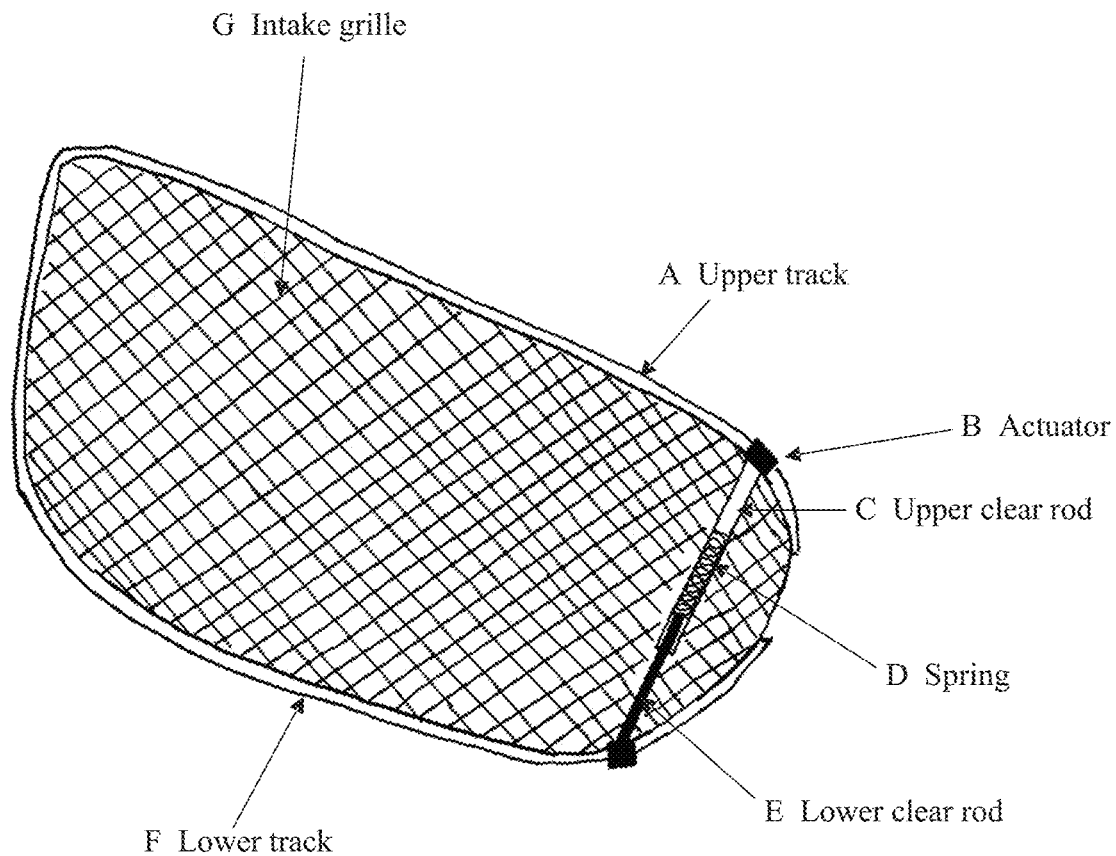
FIG. 6 is a schematic enlarged view of the foreign-object wiper of FIG. 5.

5. FIG. 6 is a schematic enlarged view of the foreign-object wiper of FIG. 5; in which A stands for the upper track for the foreign-object wiper, B stands for the actuator of the foreign-object wiper, C stands for the upper clear rod, D stands for the spring, E stands for the lower clear rod, F stands for the lower track for the foreign-object wiper, and G stands for the intake grille.

Figure 7:
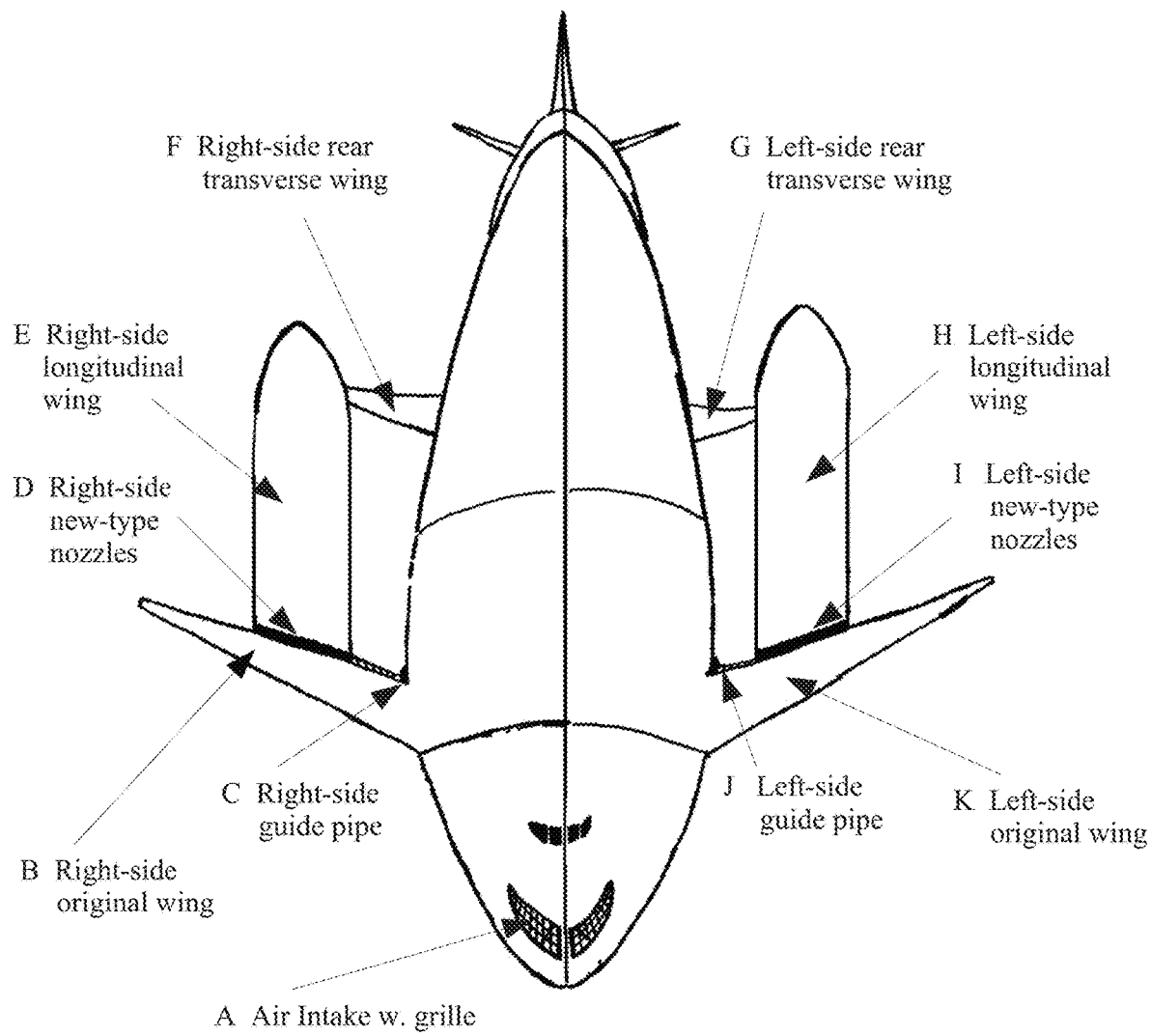
FIG. 7 is a schematic view of an airplane equipped with two rear-nozzle engines and modified by adding a pair of transverse wings and a pair of longitudinal wings in accordance with this disclosure.

6. FIG. 7 is a schematic view of an airplane equipped with two rear-nozzle engines and modified by adding a pair of transverse wings and a pair of longitudinal wings in accordance with Plane 2 of this disclosure; where the engine nozzle is located at the rear portion of the original wing of the airplane, and the exhaust gas of the engine is directly ejected to flow through the longitudinal wing; in which A stands for the air intake furnished with the intake grille, B stands for the right-side original wing, C stands for the guide pipe for the right-side engine, D stands for the right-side new-type nozzles, E stands for the right-side longitudinal wing, F stands for the right-side rear transverse wing, G stands for the left-side rear transverse wing, H stands for the left-side longitudinal wing, I stands for the left-side new-type nozzles, J stands for the guide pipe for the left-side engine, and K stands for the left-side original wing.

Figure 8:
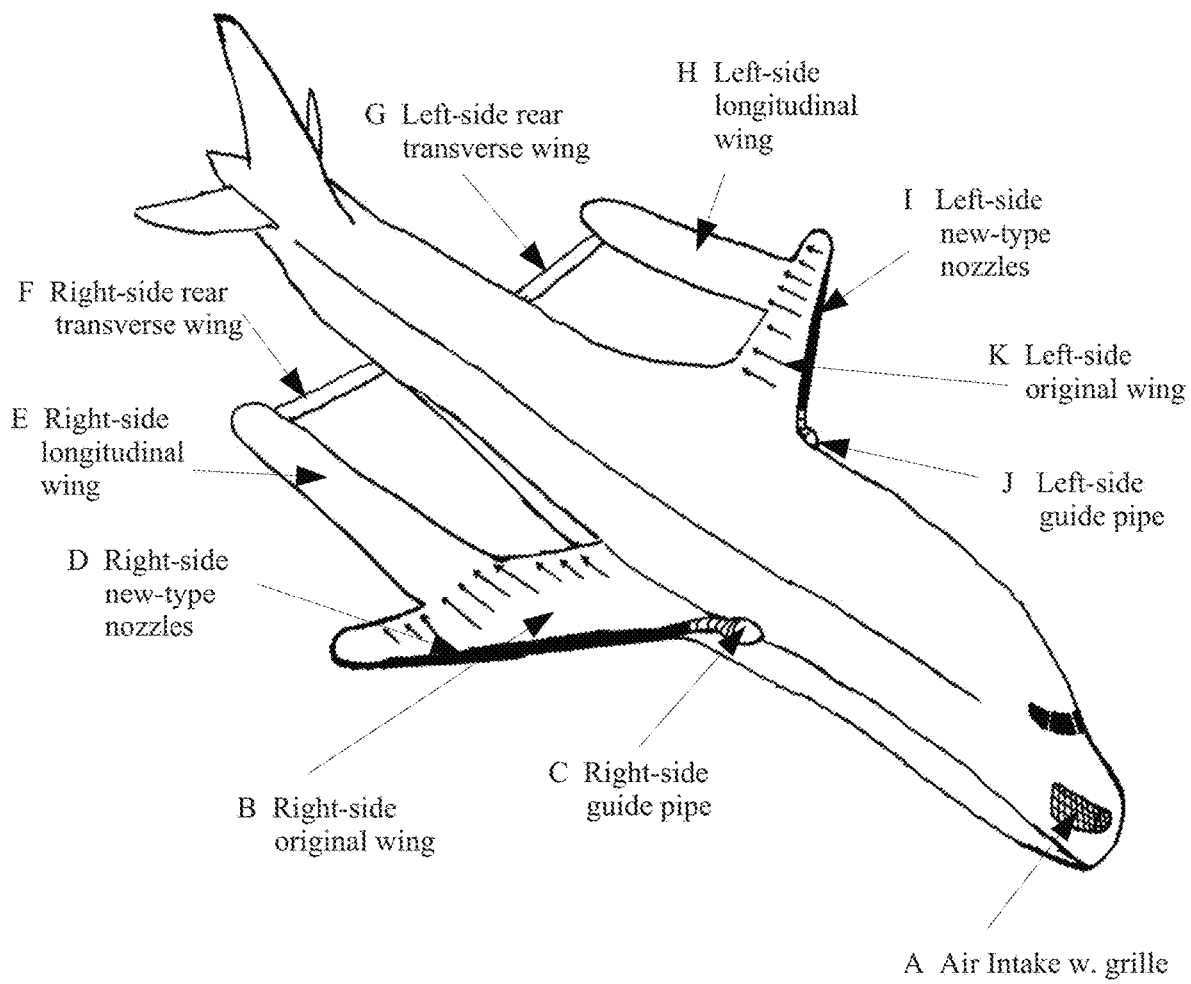
FIG. 8 is a schematic view of an airplane equipped with two front-nozzle engines and modified by adding a pair of transverse wings and a pair of longitudinal wings in accordance with this disclosure.

7. FIG. 8 is a schematic view of an airplane equipped with two front-nozzle engines and modified by adding a pair of transverse wings and a pair of longitudinal wings in accordance with Plan 3 of this disclosure. In this embodiment, the engine nozzle is located on the front portion of the original wing of the airplane, so that the exhaust gas ejected from the engine nozzle can be directed to flow through the original wing and the longitudinal wing. This embodiment of Plan 3 is an improvement of Plan 1 by adding a pair of longitudinal wings F and I, and a pair of rear transverse wings G and H. In addition, the guide pipe B leading the high-speed exhaust gas to eject through the new-type nozzle C to flow through (D) upper surfaces of the original wing E and the corresponding longitudinal wing F. Since the new-type nozzles only eject the exhaust gas to flow toward the longitudinal wing, so that the original wings E and J can be made shorter. The four transverse wings E, G, H and J can still provide the forward propulsion forcing to ascend the airplane. It shall be pointed out that the two rear transverse wings G and H are also designed to support the respective longitudinal wings F and I. Further, in the figure, K stands for guide pipe connected to the engine, and can be a built-in pipe of the wing not to affect the appearance of the airplane.

The instant invention's design is mainly to eject rearward the high-speed exhaust gas from the engine of the airplane to flow through the upper surface of the wing, such that the forward propulsion forcing can be obtained via rearward ejecting the high-speed exhaust gas to push the air rearward, and also larger uplift forcing induced by a larger velocity difference vertically across the wing can be obtained to ascend the airplane at the same time. This velocity difference is generated because the air over the wing is accelerated by the ejected high-speed exhaust gas, but the air below the wing stays the same velocity, such that a bigger velocity difference is directly produced vertically across the wing, and thus more uplift forcing can be provided to ascend the airplane. Thereupon, the take-off distance of the airplane can be reduced. Since the nozzles for ejecting the high-speed exhaust gas of the engine are located at the upper portion of the wing and keep the same rearward ejection direction, thus the forward propulsion forcing contributed by the engine would be still there for promoting ascending of the airplane.

Location and shape of the air intake of the engine are changed, and an intake grille for filtering and removing foreign objects is furnished to the air intake. After building in the engine, the air intake of the engine is moved laterally to the front end of the airplane. Such an arrangement is to prevent foreign objects such as birds, from being sucking into the engine. When the airplane hits a foreign object, according to Newtonian mechanics, the foreign object would take a reaction force that may put the foreign object at a situation to be blown way. However, if the foreign object is sticked to the grille, then a foreign-object wiper would be automatically activated to move along upper and lower tracks all the way over the intake grille, so that the foreign object can be wiped off. Since the outer frame of the grille is not an equilateral rectangle, but an oval, thus the upper and lower tracks are not parallel to each other. Therefore, a clear rod of the foreign-object wiper shall have a variable length to slide along the two tracks. In one exemplary example, the clear rod is consisted of two rods telescoped together and connected by a spring. While the distance between the two tracks becomes wider, the spring would be elongated so as to make longer the clear rod. On the other hand, while the distance between the two tracks becomes narrower, the spring would be depressed by the two rods so as to make shorter the clear rod. Upon such an arrangement, the stretchable clear rod can move smoothly over the outer oval frame.

After the airplane with rear-nozzle engines is implemented with the transverse wings and the longitudinal wings, the engine nozzle is located on the front portion of the original transverse wing of the airplane, so that the exhaust gas ejected from the engine nozzle can be directed to flow through the original wing and the longitudinal wing. As an improvement of Plan 1, a pair of longitudinal wings F and I, and a pair of rear transverse wings G and H are added. In addition, the guide pipe B leading the high-speed exhaust gas to eject through the new-type nozzle C to flow through (D) upper surfaces of the original wing E and the corresponding longitudinal wing F. Since the new-type nozzles only eject the exhaust gas to flow toward the longitudinal wing, so that the original wings E and J can be made shorter. The four transverse wings E, G, H and J can still provide the forward propulsion forcing to ascend the airplane. It shall be pointed out that the two rear transverse wings G and H are also designed to support the respective longitudinal wings F and I. Further, in the figure, K stands for guide pipe connected to the engine, and can be a built-in pipe of the wing not to affect the appearance of the airplane.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An airplane, comprising:
   a main body;
   a pair of original wings attached on the main body; and
   a jet engine located at a lower front belly portion of the main body ahead of the original wings, wherein the jet engine is a built-in type and blows exhaust gas from the original wings;
   a pair of longitudinal wings with a chord length greater than a span length, wherein each of the longitudinal wings is attached to and extends from a trailing edge of one of the original wings; and
   a plurality of nozzles located at each original wing to eject the exhaust gas directly toward the longitudinal wings for providing an uplift force induced by a greater air velocity above the pair of longitudinal wings than below the longitudinal wings.

2. The airplane according to claim 1, further comprising:
   a guide pipe for leading the exhaust gas from the jet engine to an upper portion of each original wing;

wherein the guide pipe is furnished with a plurality of nozzles for receiving the exhaust gas from the jet engine, and a size of each nozzle decreases as a distance of the nozzle from the jet engine increases.

3. The airplane according to claim 2, wherein the plurality of nozzles and the guide pipe are located at a front portion of the original wings to eject the exhaust gas above the original wings and the longitudinal wings.

4. The airplane according to claim 1, wherein the plurality of nozzles is located at a rear portion of each original wing to eject the exhaust gas directly toward the longitudinal wings.

5. The airplane according to claim 4, where each of the pair of original wings connects to one of the longitudinal wings for enlarging an area above the original wings for passing the exhaust gas.

6. The airplane according to claim 1, further comprising:
a pair of transverse wings, wherein each of the transverse wings corresponds to one of the longitudinal wings; and
wherein the plurality of nozzles are located at a front portion of each original wing to eject the exhaust gas to the transverse wings and the longitudinal wings.

7. The airplane according to claim 6, wherein each longitudinal wing connects one of the original wings to one of the transverse wings.

8. The airplane according to claim 1, further comprising:
an intake grille for filtering and removing foreign objects furnished to the engine; and
a foreign-object wiper moving along upper and lower tracks over the grille in an outward direction for wiping out foreign objects.

9. The airplane according to claim 8, wherein an outer frame of the intake grille is oval, the upper and lower tracks are not parallel to each other, and the foreign-object wiper has a clear rod with a variable length to slide along the two tracks.

10. The airplane according to claim 9, wherein the clear rod consists of two rods telescoped together and connected by a spring, while a distance between the two tracks becomes wider, the spring is elongated to extend the clear rod, and while the distance between the two tracks becomes narrower, the spring is depressed to shorten the clear rod.

11. An airplane, comprising:
a main body; a pair of wings attached on the main body;
a jet engine located at a lower front belly portion of the main body ahead of the wings, wherein the jet engine is a built-in type;
a guide pipe for leading exhaust gas ejected from the jet engine to an upper portion of each wing;
an intake grille for filtering and removing foreign objects furnished to the engine; and
a foreign-object wiper moving along upper and lower tracks over the grille in an outward direction for wiping out foreign objects;
wherein the guide pipe is furnished with a plurality of nozzles for receiving the exhaust gas from the engine, and a size of each nozzle decreases as a distance of the nozzle from the engine increases.

12. A method for providing a lifting force for an airplane with a main body and a pair of original wings, comprising:
positioning a jet engine at a lower front belly portion of the main body ahead of the original wings, wherein the jet engine is a built-in type and blows exhaust gas from the original wings;
providing a pair of longitudinal wings, wherein each of the longitudinal wings is attached to and extends from a trailing edge of corresponding to one of the original wings; and
providing a plurality of nozzles located at each original wing to eject the exhaust gas directly toward the longitudinal wings for providing an uplift force induced by a greater air velocity above the pair of longitudinal wings than below the longitudinal wings;
providing a pair of transverse wings, wherein each of the transverse wings corresponds to one of the longitudinal wings; and
positioning the plurality of nozzles at a front portion of each original wing to eject the exhaust gas to the transverse wings and the longitudinal wings.

13. The method according to claim 12, further comprising:
positioning the plurality of nozzles at a rear portion of each original wing to eject the exhaust gas directly toward the longitudinal wings.

14. The method according to claim 12, further comprising:
filtering and removing foreign objects furnished to the jet engine with an intake grille; and
wiping out foreign objects by moving a foreign-object wiper along upper and lower tracks over the grille in an outward direction.

15. The method according to claim 12, wherein each longitudinal wing connects one of the original wings to one of the transverse wings.

16. The method according to claim 12, further comprising:
providing a guide pipe for leading the exhaust gas from the jet engine to an upper portion of each original wing;
wherein the guide pipe is furnished with a plurality of nozzles for receiving the exhaust gas from the engine, and a size of each nozzle decreases as a distance of the nozzle from the engine increases.

17. The method according to claim 16, further comprising:
positioning the plurality of nozzles and the guide pipe at a front portion of the original wings to eject the exhaust gas above the original wings and the longitudinal wings.

18. The method according to claim 17, further comprising:
enlarging an area above the original wings for passing the exhaust gas by connecting each of the pair of original wings to the longitudinal wing.

19. An airplane, comprising:
a main body;
a pair of original wings attached on the main body;
a jet engine located at a lower front belly portion of the main body ahead of the original wings, wherein the jet engine is a built-in type and blows exhaust gas from the original wings; and
a pair of longitudinal wings with a chord length greater than a span length, wherein each of the longitudinal wings is attached to and extends from a trailing edge of one of the original wings.

* * * * *